United States Patent [19]

Kashigi

[11] Patent Number: 4,506,286
[45] Date of Patent: Mar. 19, 1985

[54] PAL DIGITAL VIDEO SIGNAL PROCESSING ARRANGEMENT

[75] Inventor: Kazuo Kashigi, Tokyo, Japan

[73] Assignee: Nippon Electric Co., Ltd., Tokyo, Japan

[21] Appl. No.: 436,897

[22] Filed: Oct. 26, 1982

[30] Foreign Application Priority Data

Oct. 27, 1981 [JP] Japan .................... 56-171688

[51] Int. Cl.³ .................................. H04N 9/32
[52] U.S. Cl. ......................................... 358/13
[58] Field of Search ............... 358/314, 312, 313, 11, 358/13, 24, 31, 40; 307/445, 471

[56] References Cited

U.S. PATENT DOCUMENTS 4,322,739  3/1982  Drewery .................... 358/13

OTHER PUBLICATIONS

Devereux, V. G., "Differential coding of PAL Colour signals using same line and two-dimensional Prediction", BBC Research Dept., Report No. 1975/20, 1975.

Primary Examiner—Richard Murray
Attorney, Agent, or Firm—Sughrue, Mion, Zinn, Macpeak & Seas

[57] ABSTRACT

A PAL digital video signal processing arrangement includes converter circuitry for sampling a PAL system video signal in response to sampling pulses having sampling points associated with ±U and ±V modulation axes on a color vector plane to convert an analog composite video signal containing a luminance signal and a color subcarrier into a digital video signal, and a modulation axis inverting configuration for inverting the polarity of the digitized color subcarrier at the sampling points associated with the ±V axis.

7 Claims, 7 Drawing Figures

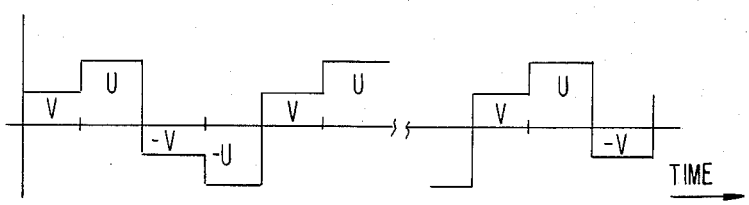
FIG.1A n-th LINE
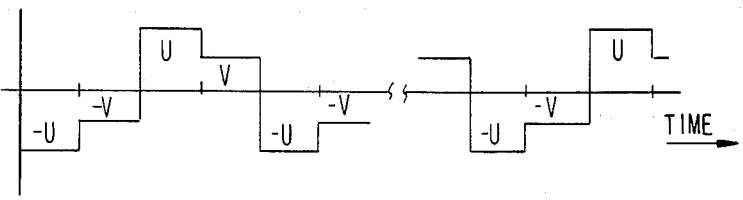
FIG.1B (n+1)-th LINE
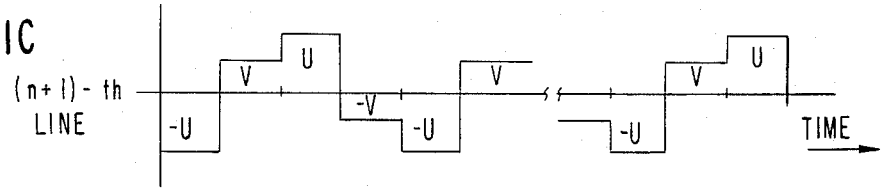
FIG.1C (n+1)-th LINE
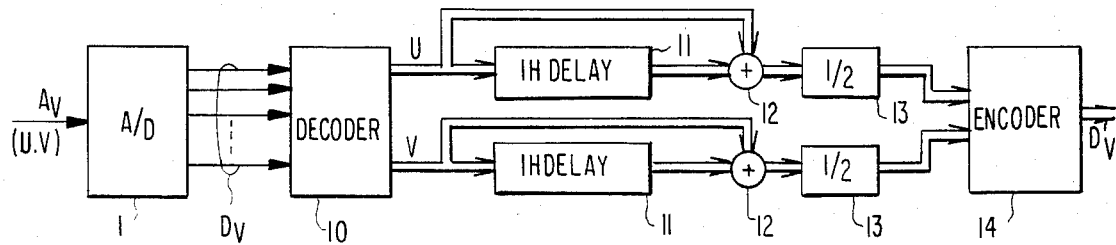
FIG. 2 PRIOR ART
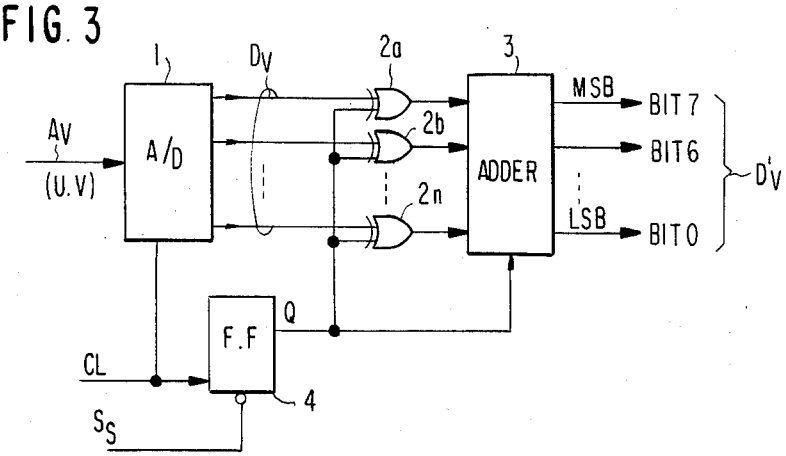
FIG. 3

PAL DIGITAL VIDEO SIGNAL PROCESSING ARRANGEMENT

BACKGROUND OF THE INVENTION

The present invention relates to a processing arrangement for a PAL digital video signal, and more particularly to an arrangement for processing a digital color subcarrier carrying chrominance signals such as U and V signals into which the color subcarrier is sampled on a discrete time base.

A PAL composite video signal contains a luminance (Y) signal, a (B-Y) color difference (U) signal and a (R-Y) color difference (V) signal. The U and V signals are simultaneously carried by a color subcarrier which is joined in the Y signal.

In general, a color video signal containing the Y signal and the color subcarrier is sampled at a rate, which is, for example, three, four or more times as much as a subcarrier frequency, to produce a digital color video signal. The digital color video signal is often used for various processing. With a digital video special effect system, for example, a video image is compressed and magnified under such digital processing. Digitization of the television signal may facilitate the video signal to be stored, read out and delayed with stable and desired characteristics. Frequently a selected sampling rate for digitization of the video signal is four times as much as the color subcarrier frequency. In the case of the sampling rate equal to four times the subcarrier frequency, a sampling axis is preferably set to $\pm I$ and $\pm Q$ axes on a color vector plane for the NTSC video signal, and to $\pm U$ and $\pm V$ axes for the PAL video signal.

In a PAL digital video signal, especially, in a digitized PAL color subcarrier, the sequence of samples is associated with the V, U, $-V$, $-U$ axes and so on while the PAL video signal has not yet been encoded for broadcasting.

In the modulation of the PAL signal for broadcasting, the phase of the V signal, i.e. the (R-Y) color difference signal, is inverted from one to another horizontal line. Therefore, when the sequence of samples on one line is aligned by V, U, $-V$, $-U$ axes and so on, the sequence of samples on the succeeding line is aligned by $-V$, U, V, $-U$ axes and so on.

In the PAL system, furthermore, the relationship $$f_{SC} = \left( \frac{1135}{4} + \frac{1}{625} \right) f_H$$

is established between the subcarrier frequency $f_{SC}$ and the horizontal synchronous frequency $f_H$ so that each line includes 283.7516 subcarriers. When such the PAL color video signal is sampled at the rate equal to four times the subcarrier frequency, each line contains 1135.0064 ($=283.7516\times4$) samples. Since the decimal fraction is so small as to be negligible, it may thus be considered that each line ultimately contains 1,135 samples or numbers of digital data, which number is an odd number. Consequently, the sequence of samples on one line starts with V, U, $-V$, $-U$ axes and so on, and ends with the series of V, U and $-V$ axes. That is, it ends with the $-V$ axis so that a sampling point associated with the next $-U$ axis will be involved in the successive line. In this manner, one sample is shifted from one line to the succeeding line. In addition, with the PAL system, modulation axes for V signals are inverted between successive lines as described above, resulting in losing correspondence in arrangement of samples between two successive lines.

The above-mentioned characteristics of the PAL system prevent direct arithmetic operations on digitally sampled data, such as addition, subtraction, averaging, etc., between successive lines. Rather than direct operations, a color decoder was conventionally used to restore original V and U signals, which are in turn operated on in various kinds of processing. Such provision for a color decoder results in complicating the circuit configuration and deteriorating the video information.

SUMMARY OF THE INVENTION

It is therefore an object of the invention to provide a PAL digital video signal processing arrangement for converting a digitized color subcarrier into a form facilitating direct arithmetic operations between successive lines without employing a color decoder circuit.

In accordance with the present invention, a PAL digital video signal processing arrangement makes a conversion in such a manner that digital data associated with a $\pm V$ axis involved in a sample sequence of one line are coincident with those of the preceding line, although the modulation axis for the V signal is inverted between successive lines.

BRIEF DESCRIPTION OF THE DRAWINGS

The objects and features of the invention will become more apparent from a consideration of the following detailed description of the preferred embodiments taken in conjunction with the accompanying drawings in which:

FIG. 1A shows modulation axes on a color vector plane for each sampling point on an n-th line, when the PAL color subcarrier is sampled at a rate equal to four times the subcarrier frequency thereof;

FIG. 1B is a figure similar FIG. 1A and shows the modulation axes on the color vector plane with respect to an (n+1)-th line;

FIG. 1C depicts the inversion of the sampling points associated with V and $-V$ axes on a color vector plane in the sequence of samples shown in FIG. 1B;

FIG. 2 shows a schematic block diagram of a prior art circuit arrangement for averaging data on two adjacent lines;

FIG. 3 illustrates a schematic block diagram of an embodiment in accordance with the present invention, in which digital data associated with V and $-V$ axes on the color vector plane are inverted in polarity;

DESCRIPTION OF THE PREFERRRED EMBODIMENTS

Figure 4:
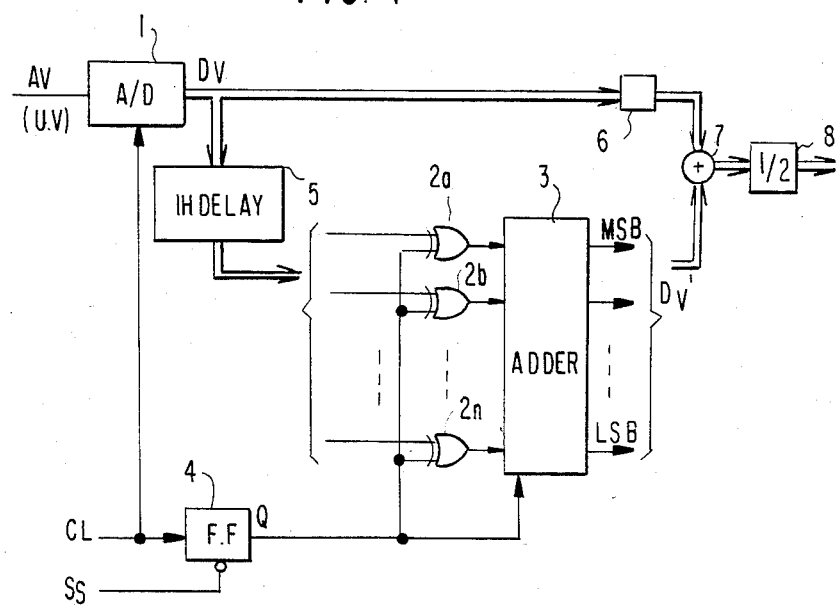
FIG. 4 depicts a schematic blocking diagram of another embodiment of the present invention, in which an average value is derived between adjacent lines.

FIGS. 1A and 1B show modulation axes of sampling points of two successive lines of the PAL color subcarrier, when the PAL video signal is sampled at a rate equal to four times as much as the subcarrier frequency thereof. In FIG. 1A, a sequence of samples on an n-th line is shown with the modulation axes of V, U, $-V$, $-U$, ..., V, U, and $-V$. FIG. 1B shows another sequence of samples on an (n+1)th line with the modulation axes of −U, −V, U, V, −U, ..., −V and U. As can clearly be seen in FIGS. 1A and 1B, the modulation axes of sampling points are completely different in alignment between two adjacent lines, and thus successive lines. This makes it impossible to arithmetic-operate directly on data between successive lines. FIG. 1C shows that the sampling points associated with ±V axes on an (n+1)-th line are inverted in their polarity. As can be seen from the figures, direct arithmetic operation on the adjacent two lines of FIG. 1A and FIG. 1C would be possible if the signal shown in FIG. 1C is shifted by one sample. In FIGS. 1A, 1B and 1C, the magnitude of the U signal is assumed to be larger than that of the V signal.

A prior art exemplary circuit arrangement shown in FIG. 2 averages data involved in two adjacent lines. In this figure, an input signal Av, which contains only the color subcarrier, i.e., never contains the Y signal, is converted into a digital PAL color subcarrier $D_v$ in an analog-to-digital (A/D) converter 1. If the input signal contains the Y signal, a luminance/chrominance (Y/C) separator should be provided between the A/D converter and a following decoder 10, and only the separated chrominance signal i.e., the color subcarrier containing the U and V signals is supplied to the decoder 10. In this specification, however, only the chrominance signal is considered as the input signal. Referring back to FIG. 2, the digital color subcarrier $D_v$ is converted by a decoder 10 into the digital U signal and the V signal, each consisting of parallel bits. The digital U and V signals are transmitted to averaging circuits each including a 1H delay 11, an adder 12 and a ½ coefficient circuit 13, respectively. An encoder 14 receives the averaged U and V signals and produces digital signals $D_v'$ similar to the original digital color subcarrier $D_v$. If the direct arithmetic operation can be made on data involved in successive lines, then the decoder 10, the averaging circuit and the encoder 14 would not be required.

Now with reference to FIG. 3, showing an embodiment of the present invention, an input signal $A_v$ containing only a color subcarrier, in this case, is converted by an analog-to-digital (A/D) converter 1 into a digital color subcarrier, i.e., eight parallel bits of digital data $D_v$, which are in turn transmitted to an adder 3 through exclusive OR gates 2a to 2h. The polarity of the digital color subcarrier expressed by the digital data $D_v$ is inverted by combination circuitry of exclusive OR gates 2a to 2h with the adder 3.

In general, an offset binary representation is often used for a signal format of digital data in the case of converting a signal having positive and negative polarities. In this format, the binary representation "11111111" corresponds to a peak in positive polarity of the signal, the representation "00000001" to a peak in negative polarity, and the representation "10000000" to zero. In the illustrative embodiment, an eight-bit digital representation for the digital data is used. A two's complement may therefore be produced in order to invert the polarity of the signal. More specifically, all bits of the digital data are inverted and added by a binary "1" of the least significant bit (LSB). This is accomplished in the illustrative embodiment of FIG. 3 in such a manner that exclusive OR gates 2a to 2h invert all bits of the digital data, and the adder 3 adds the LSB "1".

Timing indicating V and −V axes in the sequence of samples is generated by a flip-flop (F/F) 4, which receives a clock CL having a frequency of four times as much as the subcarrier frequency and also receives the subcarrier $S_s$ as a clear input. The subcarrier $S_s$ and clock CL are produced in association with the burst signal contained in the input signal $A_v$. The flip-flop 4 has an output Q connected in common to the other inputs of the exclusive OR gates 2a to 2h as well as the LSB input of the adder 3. The output Q derived from the flip-flop 4 is alternately inverted in polarity in response to the clock CL thus provided, and is synchronous with every four samples, i.e., one cycle period of the subcarrier, of the sequence of samples of the digital data delivered from the analog-to-digital converter 1, due to reception of the subcarrier $S_s$ as the clear input.

The phase of the subcarrier $S_s$ as the clear input of the flip-flop 4 is initially synchronized so as to make the flip-flop produce the output Q in the timing of the ±V axis. The synchronization can be performed in such a way, for example, that only the V signal carried by the color subcarrier is supplied to the A/D converter 1 as the input signal $A_v$ and then the phase of the subcarrier $S_s$ is adjusted to derive the output "1" from the adder 3.

As a result, at the sampling points associated with V and −V axes, the exclusive OR gates 2a to 2h invert the digital signal, and the adder 3 adds the LSB "1" to the output of the exclusive OR gates. At the output from the adder 3, the color subcarrier represented by the digital data is produced in which the V and −V axes of the input color subcarrier have respectively been converted into −V and V axes. As a result, the digital color subcarrier $D_v'$ in which the polarities of V and −V axes are inverted is derived from the outputs of the adder 3.

It should be appreciated that while the digital color subcarrier $D_V$ which contains the U and V signals has been applied to the embodiment shown in FIG. 3, a possible modification would be to have the digital V signal extracted from the digital color subcarrier $D_V$ and applied to the same configuration of FIG. 3, including the exclusive OR gates 2a to 2h and the adder 3.

FIG. 4 shows another embodiment of the present invention in which the conversion circuitry shown in FIG. 3 is utilized as arithmetic circuitry for directly averaging pairs of data involved in two adjacent lines. An analog-to-digital converter 1 provides a digitized color subcarrier $D_V$ which is connected via a 1H delay 5 to the V and −V axes inverting circuitry shown in FIG. 3. The ±V axis inverted signal $D_v'$ is added by another adder 7 to the signal $D_v$ delivered from the analog-to-digital converter 1 through a one-sample delay 6 which delays the signal $D_v$ by one sampling period of time. A coefficient circuit 8 multiplies the digital data from the adder 7 by a coefficient of ½ to produce an averaged resultant digital video signal. The aforementioned circuit configuration eliminates the necessity of complicated decoding circuitry for restoring the digital data at the ±V axis to the original U and V signals thereof, and facilitates the direct arithmetic operation on pairs of data between successive lines. In FIG. 4, the input signal $A_v$ also contains only the color subcarrier and does not contain the Y signal.

Figure 5:
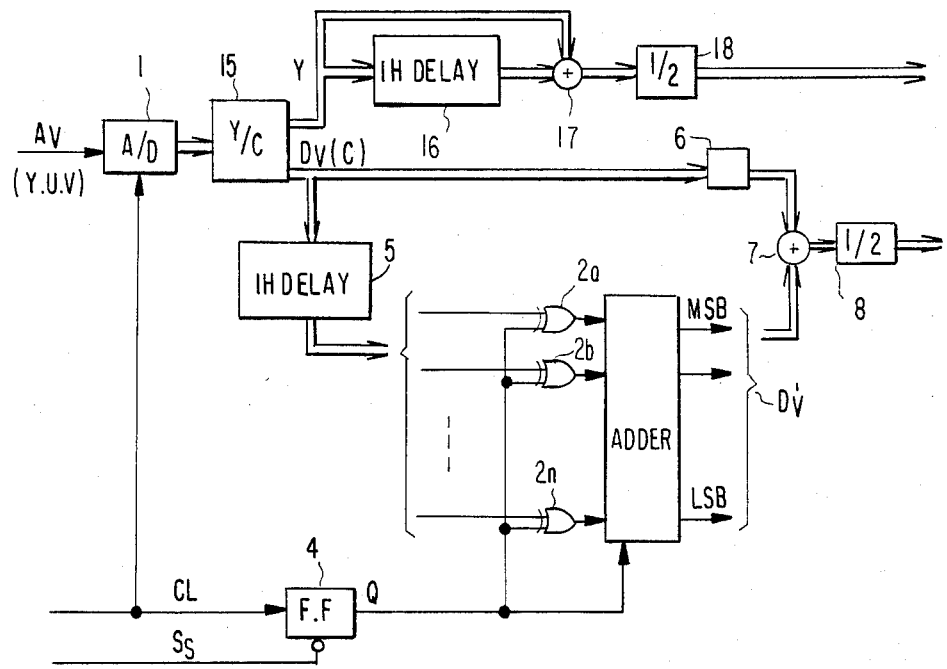
FIG. 5 illustrates modification of the embodiment shown in FIG. 4.

FIG. 5 shows modification of the embodiment shown in FIG. 4. In FIG. 5, an analog PAL composite signal which contains both the Y signal and the chrominance signal is supplied to an A/D converter 1 so that a Y/C separator 15 is provided after the A/D converter 1. The process which then follows for the chrominance signal is the same as that described for the embodiment of FIG. 4. In addition, averaging circuitry for the Y signal, including a 1H delay 16, an adder 17 and a ½ coefficient circuit 18 is supplied in the modification.

It should be noted that although in the prior art a direct addition and a subtraction have been made between two adjacent lines in the form of an analog signal $A_v$ in a PAL system television receiver, in the present invention the arithmetic operation is advantageously made in the form of the digital signal $D_v$ so as to establish a much more accurate and precise signal processing that satisfies the requirements under the broadcasting standards.

In accordance with the present invention, as discussed above, the polarity inversion of the $\pm V$ axis of the PAL digital video signal is accomplished by the relatively simpler circuit configuration, and the arithmetic operation on successive lines is therefore achieved without employing the conventional color decoder circuit.

While the invention has been described and shown with reference to the particular illustrative embodiments thereof, it is to be noted that it is susceptible to changes, modifications or equivalent substitutions without departing from the scope and spirit of the invention defined in the appended claims.

What is claimed is:

1. A PAL video signal processor comprising:
   converter means for converting a color subcarrier into a digital signal, said color subcarrier being sampled at sampling points associated with $\pm U$ and $\pm V$ axes on a color vector plane; and
   inverter means for inverting the polarity of said digital signal at the sampling points associated with the $\pm V$ axis.

2. A PAL video signal processing arrangement comprising:
   converter means for converting a color subcarrier into a color subcarrier, said digital signal being sampled at sampling points associated with $\pm U$ and $\pm V$ axes on a color vector plane and said digital signal consisting of a plurality of parallel bits;
   means for generating a timing signal associated with $\pm V$ axis;
   a plurality of exclusive OR gates each for receiving said timing signal and a respective one of said parallel bits; and
   means for adding the timing signal to the least significant bit of the outputs of said plurality of exclusive OR gates.

3. The PAL video signal processing arrangement as claimed in claim 2, wherein said sampling points are determined by a sampling pulse having a frequency of four times as much as the frequency of said subcarrier and said timing signal generating means includes a flip-flop receiving the sampling pulse as a clock thereof.

4. A PAL video signal processor receiving a digitized color subcarrier sampled at sampling points associated with $\pm U$ and $\pm V$ axes of a color vector plane, said processor comprising:
   first means for delaying said digitized color subcarrier by one horizontal scanning period to provide a first delayed signal;
   means for inverting the polarity of said first delayed signal at the sample points associated with $\pm V$ axes to provide an inverted first delayed signal;
   second means for delaying said digitized color subcarrier by one sample period to provide a second delayed signal; and
   means for averaging the inverted first delayed signal and the second delayed signal.

5. A PAL video signal processor as recited in claim 4, wherein said sampled digitized color subcarrier comprises a plurality of parallel bits, and said means for inverting comprises:
   a means for generating a timing signal associated with the $\pm V$ axes;
   a plurality of exclusive OR gates each receiving said timing signal and a respective one of said parallel bits; and
   means for adding said timing signal to the least significant bit of the outputs of said plurality of exclusive OR gates.

6. A PAL video signal processor as recited in claim 4, wherein said means for averaging comprises:
   an adder for adding said first delayed signal to said second delayed signal to provide a sum signal; and
   a multiplier for multiplying said sum signal by a predetermined coefficient.

7. A PAL video signal processor for receiving and processing a digitized color subcarrier sampled at sampling points associated with $\pm U$ and $\pm V$ axes of a color vector plane, said processor comprising:
   inverting means for inverting the polarity of said digitized color subcarrier sampled at sampling points corresponding to $\pm V$ axes; and
   processing means for processing said digitized color subcarrier sampled at sampling points corresponding to said $\pm U$ axes together with the inverted digitized color subcarrier sampled at sampling points corresponding to said $\pm V$ axes.

* * * * *

UNITED STATES PATENT AND TRADEMARK OFFICE
CERTIFICATE OF CORRECTION

PATENT NO. : 4,506,286

DATED : March 19, 1985

INVENTOR(S) : Kazuo KASHIGI,

It is certified that error appears in the above-identified patent and that said Letters Patent is hereby corrected as shown below:

Column 1, line 55, after "When" delete --such--.

Column 5, line 37, delete "color subcarrier" and insert --digital signal--;

line 37, after "said" delete "digital signal" and insert --color subcarrier--.

Signed and Sealed this

Third Day of September 1985

[SEAL]

Attest:

DONALD J. QUIGG

Attesting Officer  Acting Commissioner of Patents and Trademarks - Designate